(12) United States Patent
Tseng et al.

(10) Patent No.: US 8,106,531 B2
(45) Date of Patent: Jan. 31, 2012

(54) MULTI-OUTPUT SWITCHING REGULATOR AND CONTROL METHOD THEREFOR

(75) Inventors: Ching-Jung Tseng, Taipei (TW); Jui-Li Lan, Xindian (TW); Jing-Meng Liu, Chupei (TW)

(73) Assignee: Richtek Technology Corporation (TW)

( * ) Notice: Subject to any disclaimer, the term of this patent is extended or adjusted under 35 U.S.C. 154(b) by 133 days.

(21) Appl. No.: 12/592,760

(22) Filed: Dec. 2, 2009

(65) Prior Publication Data
US 2010/0164282 A1 Jul. 1, 2010

(30) Foreign Application Priority Data
Dec. 26, 2008 (TW) .............................. 97151114 A

(51) Int. Cl.
*H02J 3/14* (2006.01)
(52) U.S. Cl. ......................................................... 307/38
(58) Field of Classification Search ............... 307/11, 307/31, 38; 323/222, 267
See application file for complete search history.

(56) References Cited

U.S. PATENT DOCUMENTS 5,552,695 A * 9/1996 Schwartz ....................... 323/271
6,198,645 B1 * 3/2001 Kotowski et al. ............... 363/59

* cited by examiner

*Primary Examiner* — Jared Fureman
*Assistant Examiner* — Carlos Amaya
(74) *Attorney, Agent, or Firm* — Tung & Associates

(57) ABSTRACT

The present invention discloses a multi-output switching regulator, comprising: a single-input-multiple-output voltage converter converting an input voltage to a first output voltage at a first node and a second output voltage at a second node; an input capacitor connected with the input voltage at an input node; a first output capacitor having two ends, one of which is connected with the first node; and a second output capacitor having two ends, one of which is connected with the second node; wherein the other end of the first output capacitor is connected to ground, the input node or the second node, and the other end of the second output capacitor is connected to ground, the input node or the first node.

5 Claims, 9 Drawing Sheets

MULTI-OUTPUT SWITCHING REGULATOR AND CONTROL METHOD THEREFOR

BACKGROUND OF THE INVENTION

1. Field of Invention

The present invention relates to a multi-output switching regulator and a control method therefor, and particularly to a switching regulator capable of providing different output voltages or reducing the requirement for capacitor specification by connecting output capacitors in different forms, and a control method therefor.

2. Description of Related Art

U.S. Pat. No. 7,327,124 granted to the applicant of the present invention discloses an inverter-boost switching regulator. As shown in FIG. 1, a single-input-multiple-output voltage converter 1 comprises power transistors S1-S4 and an inductor L, wherein the power transistors S1 and S2 and the inductor L form an inverter switching regulator which converts an input voltage Vin to a negative voltage in the first output capacitor Cout1, as a first output voltage Vout1. In addition, the transistors S3 and S4 and the inductor L form a boost switching regulator, which converts the input voltage Vin to a positive voltage in the second output capacitor Cout2, as a second output voltage Vout2 which is higher than the input voltage Vin.

The present invention further improves the foregoing prior art, providing a switching regulator with multiple outputs, and a control method therefor.

SUMMARY OF THE INVENTION

A first objective of the present invention is to provide a multi-output switching regulator, which is, capable of providing different output voltages or reducing the requirement for capacitor specification by connecting output capacitors in different forms.

A second objective of the present invention is to provide a control method for a multi-output switching regulator.

To achieve the foregoing objectives, in one perspective of the present invention, it provides a multi-output switching regulator comprising: a single-input-multiple-output voltage converter converting an input voltage to a first output voltage at a first node and a second output voltage at a second node; an input capacitor connected with the input voltage at an input node; a first output capacitor having two ends, one of which is connected with the first node; and a second output capacitor having two ends, one of which is connected with the second node; wherein the other end of the first output capacitor and the other end of the second output capacitor are connected by one of the following forms:

(1) the other end of the first output capacitor being connected to ground, and the other end of the second output capacitor being connected to the input node;

(2) the other end of the first output capacitor being connected to ground, and the other end of the second output capacitor being connected to the first node;

(3) the other end of the first output capacitor being connected to the input node, and the other end of the second output capacitor being connected to ground;

(4) the other end of the first output capacitor being connected to the input node, and the other end of the second output capacitor being connected to the input node;

(5) the other end of the first output capacitor being connected to the input node, and the other end of the second output capacitor being connected to the first node;

(6) the other end of the first output capacitor being connected to the second node, and the other end of the second output capacitor being connected to ground; or (7) the other end of the first output capacitor being connected to the second node, and the other end of the second output capacitor being connected to the first node.

Furthermore, according to another perspective of the present invention, it also provides a multi-output switching regulator comprising: a single-input-multiple-output voltage converter converting an input voltage to a first output voltage at a first node and a second output voltage at a second node; an input capacitor connected with the input voltage at an input node; a first output capacitor having two ends, one of which is connected with the first node; and a second output capacitor having two ends, one of which is connected with the second node; wherein the other end of the first output capacitor is switchable among ground, the input node, and the second node, and/or the other end of the second output capacitor is switchable among ground, the input node, and the first node.

In addition, according to yet another perspective of the present invention, it also provides a method for controlling a multi-output switching regulator, comprising: providing a single-input-multiple-output voltage converter, the single-input-multiple-output voltage converter converting an input voltage to a first output voltage at a first node and a second output voltage at a second node; providing an input capacitor connected with the input voltage at an input node; providing a first output capacitor having two ends, one of which is connected with the first node; providing a second output capacitor having two ends, one of which is connected with the second node; and connecting the other end of the first output capacitor and the other end of the second output capacitor by one of the following forms:

(1) the other end of the first output capacitor being connected to ground, and the other end of the second output capacitor being connected to the input node;

(2) the other end of the first output capacitor being connected to ground, and the other end of the second output capacitor being connected to the first node;

(3) the other end of the first output capacitor being connected to the input node, and the other end of the second output capacitor being connected to ground;

(4) the other end of the first output capacitor being connected to the input node, and the other end of the second output capacitor being connected to the input node;

(5) the other end of the first output capacitor being connected to the input node, and the other end of the second output capacitor being connected to the first node;

(6) the other end of the first output capacitor being connected to the second node, and the other end of the second output capacitor being connected to ground; or (7) the other end of the first output capacitor being connected to the second node, and the other end of the second output capacitor being connected to the first node.

In the foregoing multi-output switching regulator and the control method therefor, the other end of the first output capacitor and the other end of the second output capacitor can be steadily connected to a node, or switchable between two or three nodes, respectively.

The objectives, technical details, features, and effects of the present invention will be better understood with regard to the detailed description of the embodiments below, with reference to the drawings.

DESCRIPTION OF THE PREFERRED EMBODIMENTS

Figure 2:
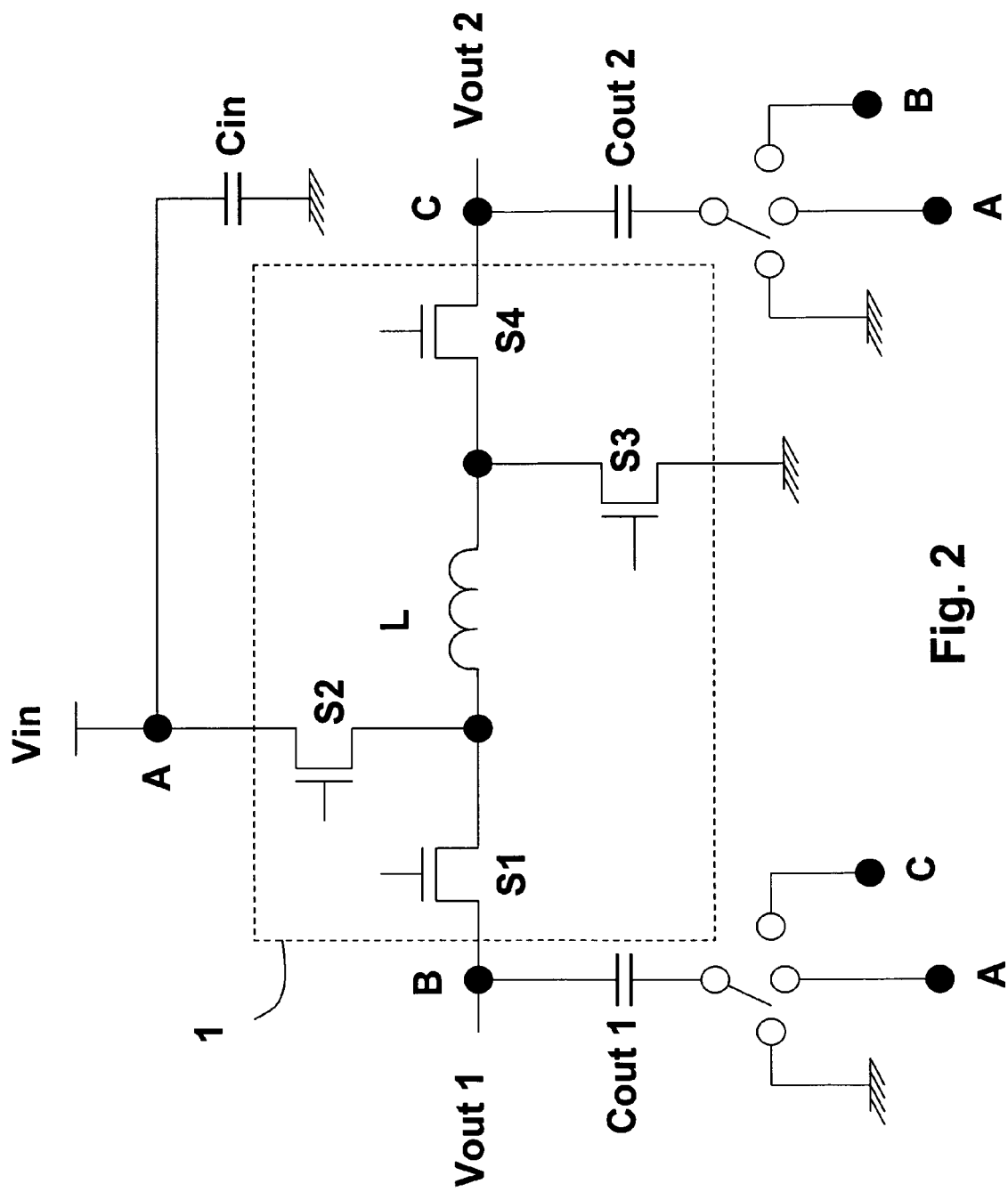
FIG. 2 explains the concept of the present invention.

Referring to FIG. 2, the main concept of the present invention is to change the connection of the output capacitor(s). As shown in the drawing, the first output capacitor Cout1 has two ends, of which one end (referred to hereafter as the upper end) is connected with a first output voltage Vout1 at the node B, and the other end (referred to hereafter as the lower end) can be coupled to ground, the input voltage Vin at the node A, or a second output voltage Vout2 at the node C. The second output capacitor Cout2 has two ends, of which one end (referred to hereafter as the upper end) is connected with the second output voltage Vout2 at the node C, and the other end (referred to hereafter as the lower end) can be coupled to ground, the input voltage Vin at the node A, or the first output voltage Vout1 at the node B.

Depending on the application of the entire circuit, the lower ends of the first output capacitor Cout1 and the second output capacitor Cout2 can be steadily connected by one of the connections described above, or, a selector may be provided by which the lower end of the first output capacitor Cout1 is switchable between two or three of ground, the node A, and the node C; and a selector may be provided by which the lower end of the second output capacitor Cout2 is switchable between two or three of ground, the node A, and the node B.

Figure 1:
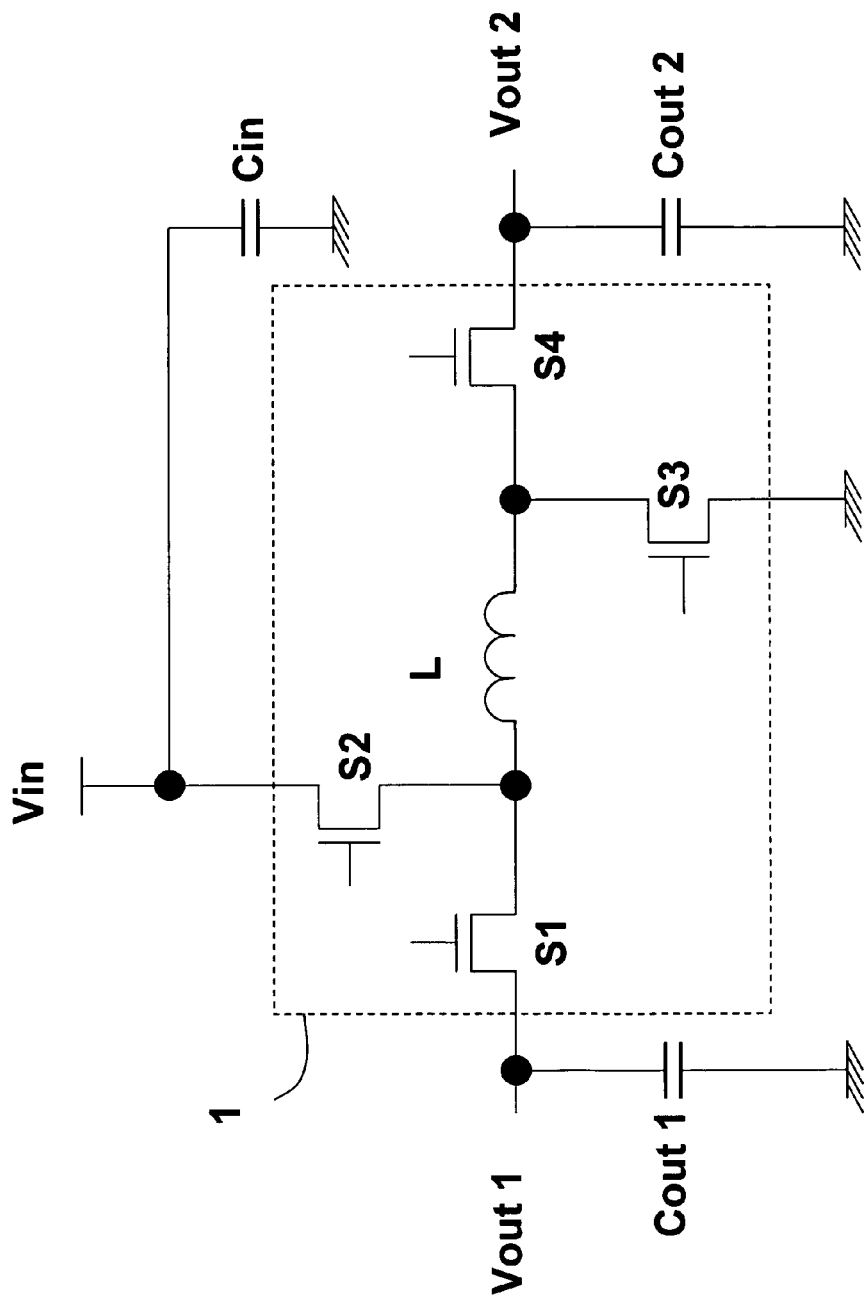
FIG. 1 is a schematic circuit diagram of a prior art inverter-boost switching regulator.

When both the lower ends of the first output capacitor Cout1 and the second output capacitor Cout2 are coupled to ground, the circuit shown in FIG. 2 is equal to that in FIG. 1. Assuming that the input voltage is Vin, that the first output voltage Vout1 is −V1, and that the second output voltage Vout2 is +V2, when the lower ends of the first output capacitor Cout1 and the second output capacitor Cout2 are connected in different forms, various different output voltages can be provided, or the requirement for the capacitor specification can be reduced.

Figure 3:
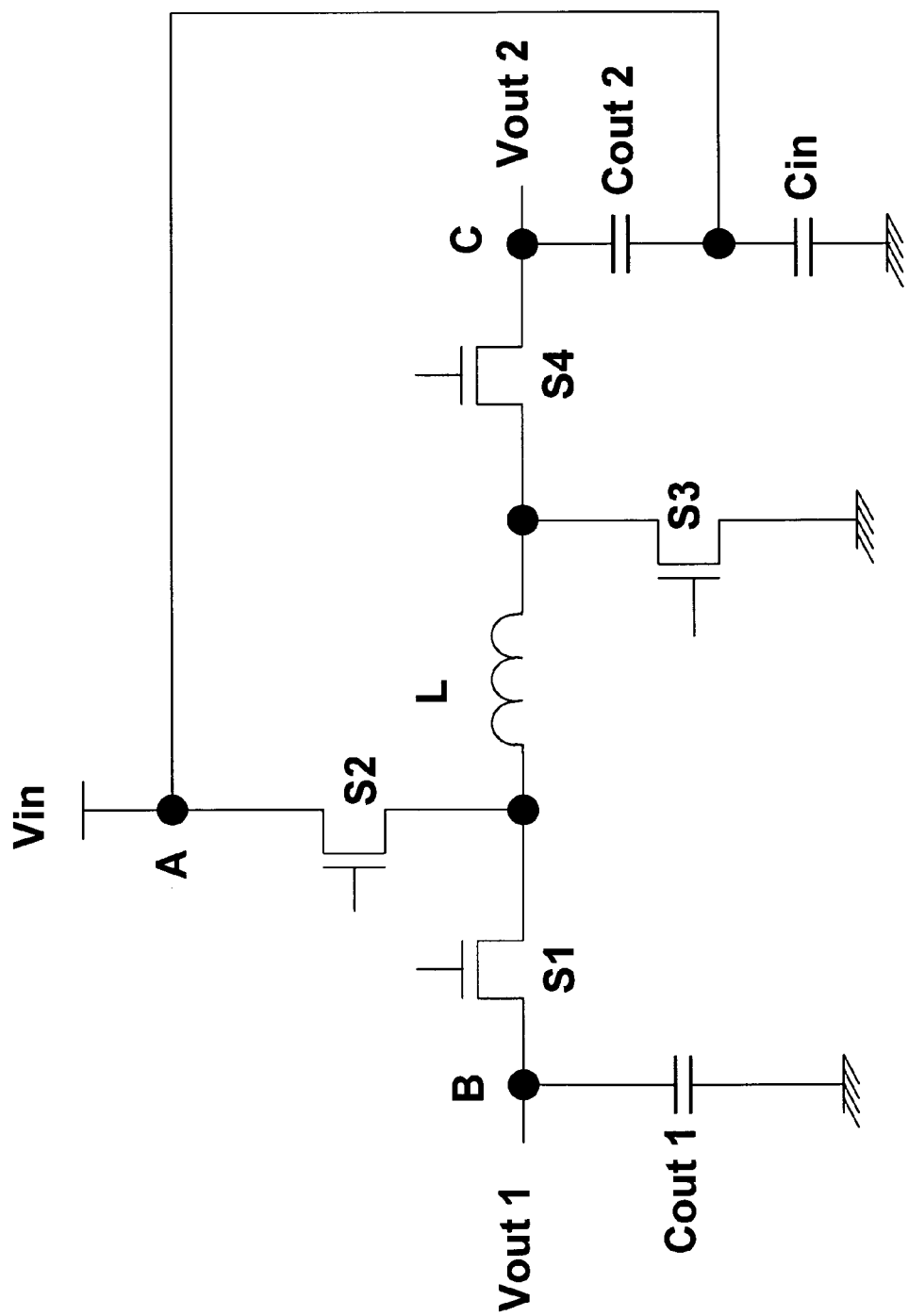
FIGS. 3-9 show several embodiments of the present invention, respectively.

More specifically, FIG. 3 shows a first possible connection, wherein the lower end of the first output capacitor Cout1 is coupled to ground, and the lower end of the second output capacitor Cout2 is coupled to the node A. The first output voltage Vout1 provided by this connection is still −V1, and the second output voltage provided by this connection can be +V2 or higher than +V2. In case the second output voltage is +V2, the advantage of this connection is that the second output capacitor Cout2 and the input capacitor Cin share the voltage +V2. Hence, a capacitor with a lower specification can be used as the second output capacitor. As well known by a person skilled in this art, for the capacitor specification to be one grade higher (i.e., to use a capacitor with a higher specification by one grade), its cost increases about double. Thus, if a capacitor with a lower specification can be used, the cost can be reduced effectively. Or, if a capacitor having the same specification as that shown in FIG. 1 is used as the second output capacitor Cout2, the second output voltage Vout2 can be higher than +V2.

Figure 4:
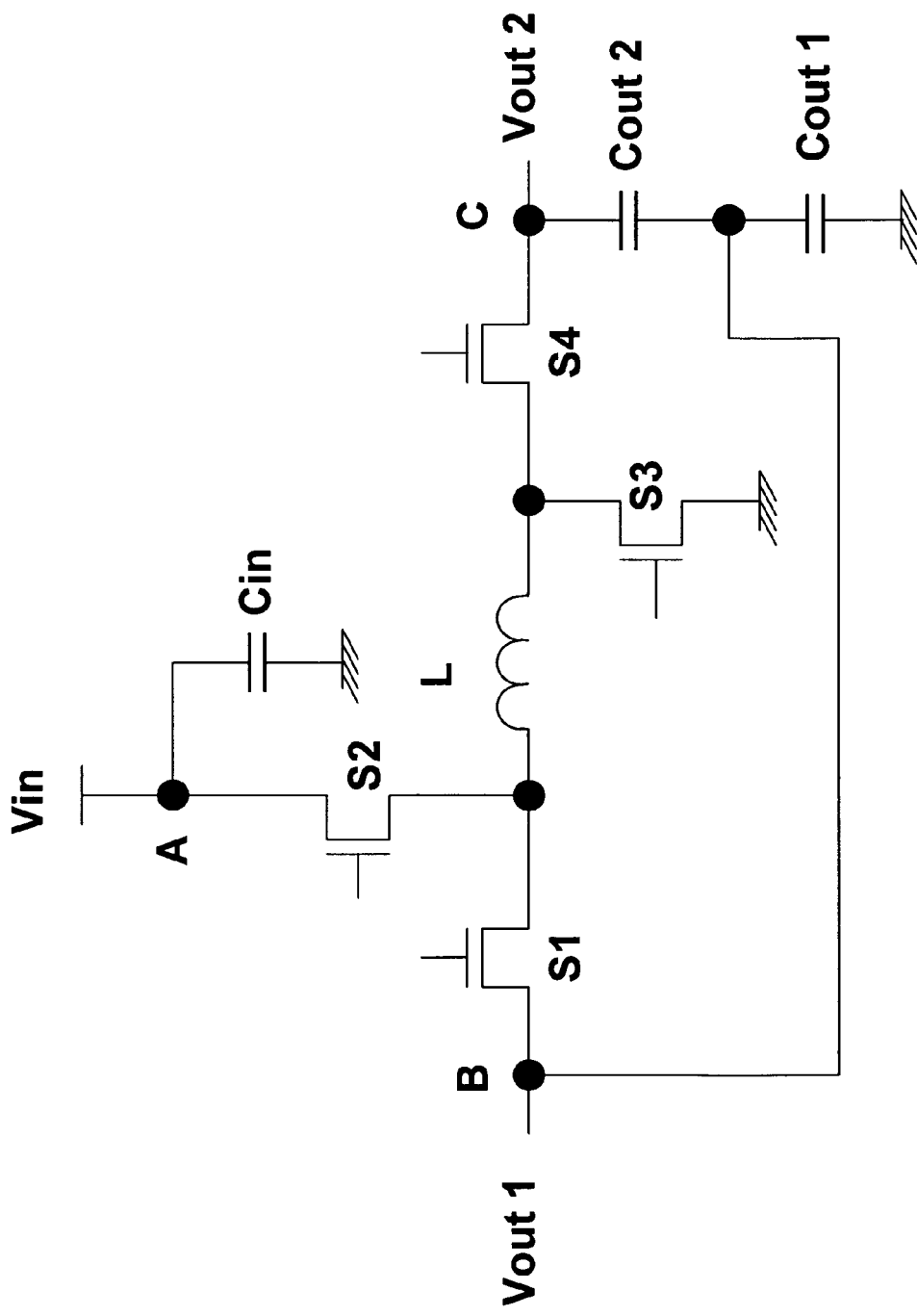

FIG. 4 shows a second possible connection of the present invention, wherein the lower end of the first output capacitor Cout1 is coupled to ground, and the lower end of the second output capacitor Cout2 is coupled to the node B, i.e., the upper end of the first output capacitor Cout1. The first output voltage Vout1 provided by this connection is still −V1, while the second output voltage provided by this connection is +V2−V1. In other words, a different voltage other than −V1 and +V2 can be provided.

Figure 5:
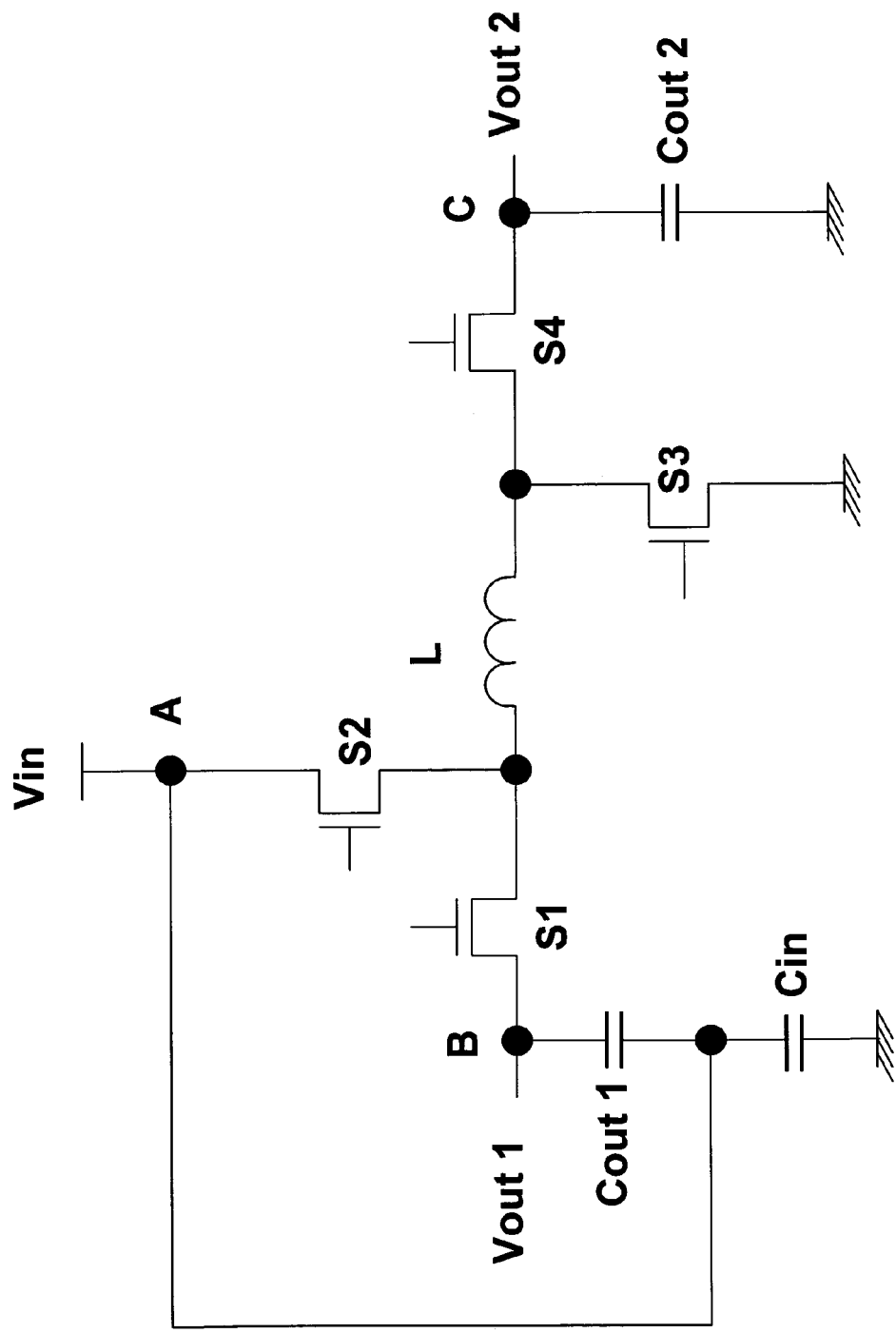

FIG. 5 shows a third possible connection, wherein the lower end of the first output capacitor is coupled to the node A, and the lower end of the second output capacitor Cout2 is coupled to ground. The second output voltage Vout2 provided by this connection is still +V2, while the first output voltage Vout1 provided by this connection is Vin−V1. Thus, a different voltage other than −V1 and +V2 can be provided.

Figure 6:
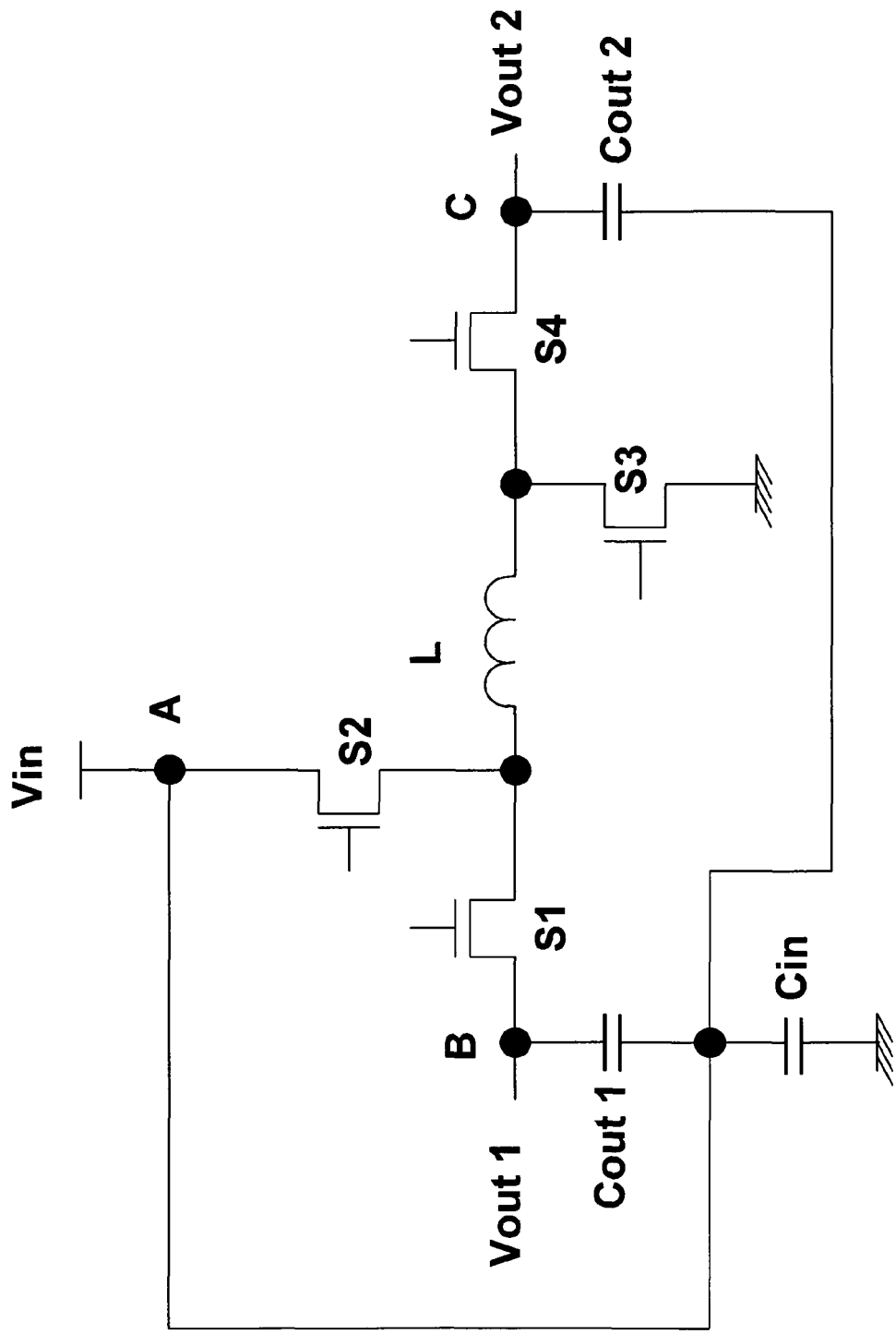

FIG. 6 shows a fourth possible connection of the present invention, wherein the lower ends of both the first output capacitor and the second output capacitor Cout2 are coupled to the node A. The first output voltage Vout1 provided by this connection is Vin−V1, and the second output voltage Vout2 may be +V2 (using a capacitor with a specification lower than that in FIG. 1) or higher than +V2 (using a capacitor with a specification the same as that in FIG. 1). In other words, in one aspect, a different voltage other than −V1 and +V2 can be provided, or in another aspect, the second output capacitor Cout2 can use a capacitor with a lower specification.

Figure 7:
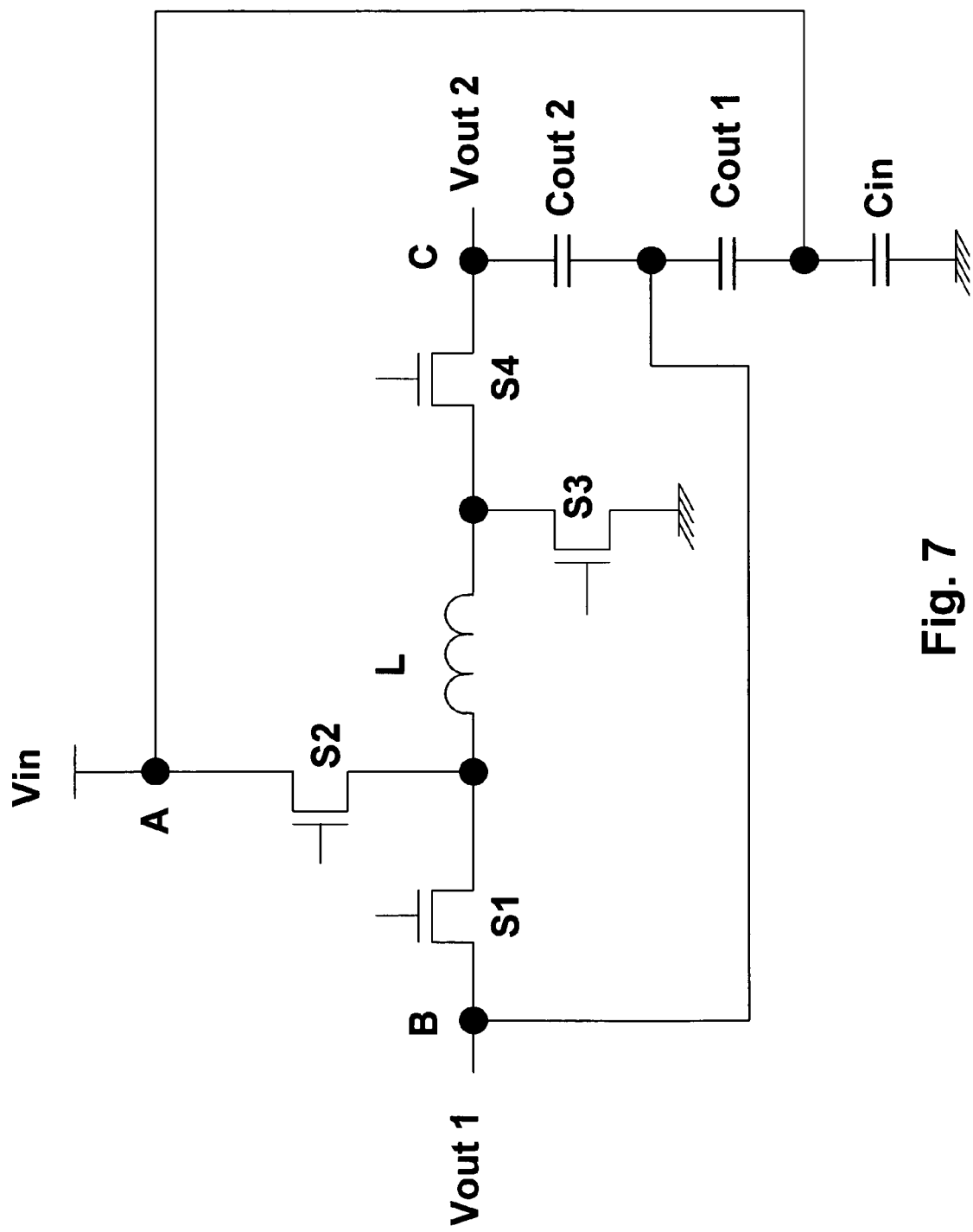

FIG. 7 shows a fifth possible connection of the present invention, wherein the lower end of the first output capacitor Cout1 is coupled to the node A, and the lower end of the second output capacitor Cout2 is coupled to the node B, i.e., the upper end of the first output capacitor Cout1. The first output voltage Vout1 provided by this connection is Vin−V1, while the second output voltage Vout2 provided by this connection is +V2+Vin−V1. As such, multiple different voltages other than −V1 and +V2 can be provided.

Figure 8:
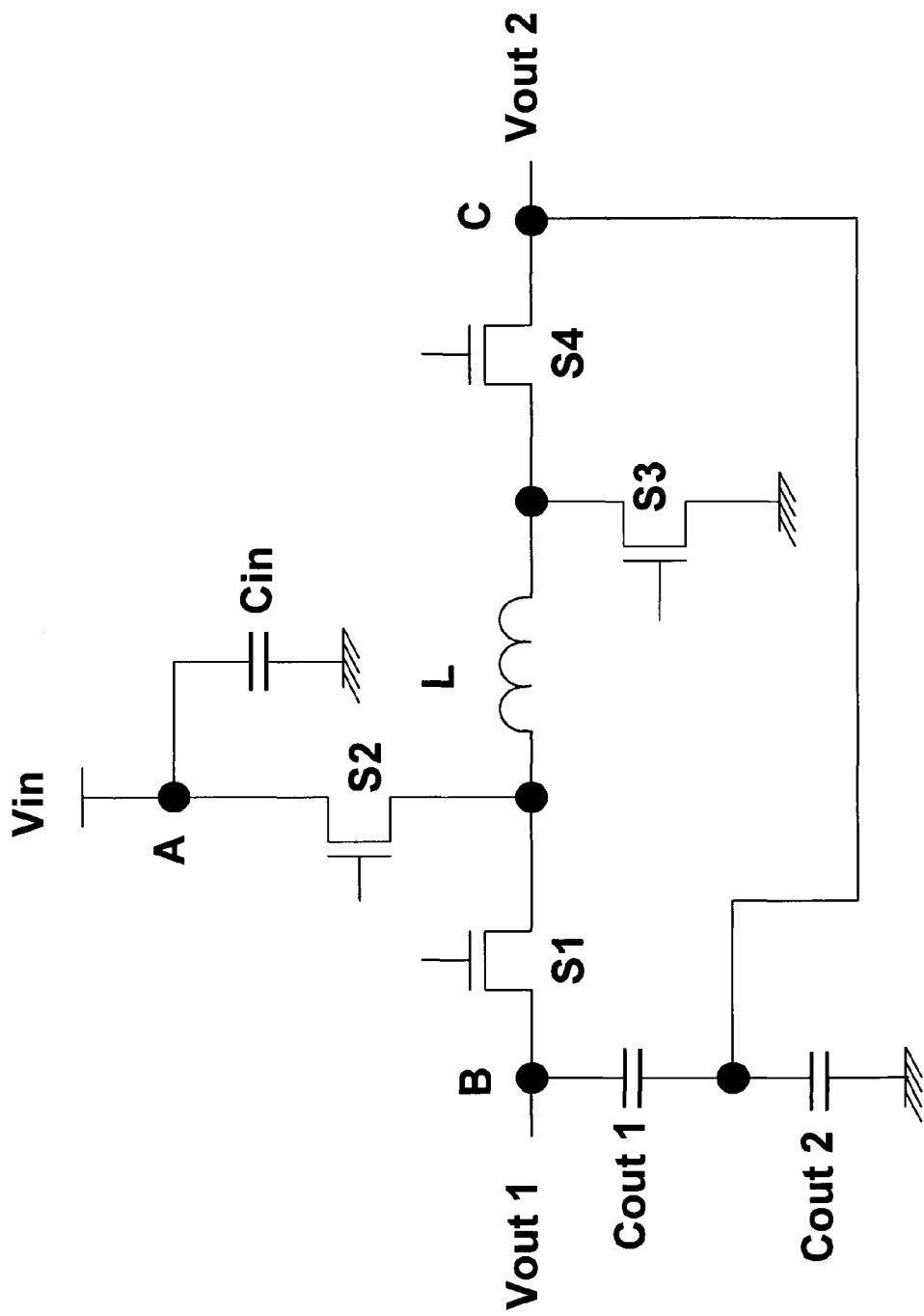

FIG. 8 shows a sixth possible connection of the present invention, wherein the lower end of the first output capacitor Cout1 is coupled to the node C, i.e., the upper end of the second output capacitor Cout2, and the lower end of the second output capacitor Cout2 is coupled to ground. The second output voltage Vout2 provided by this connection is still +V2, while the first output voltage Vout1 is +V2−V1.

Figure 9:
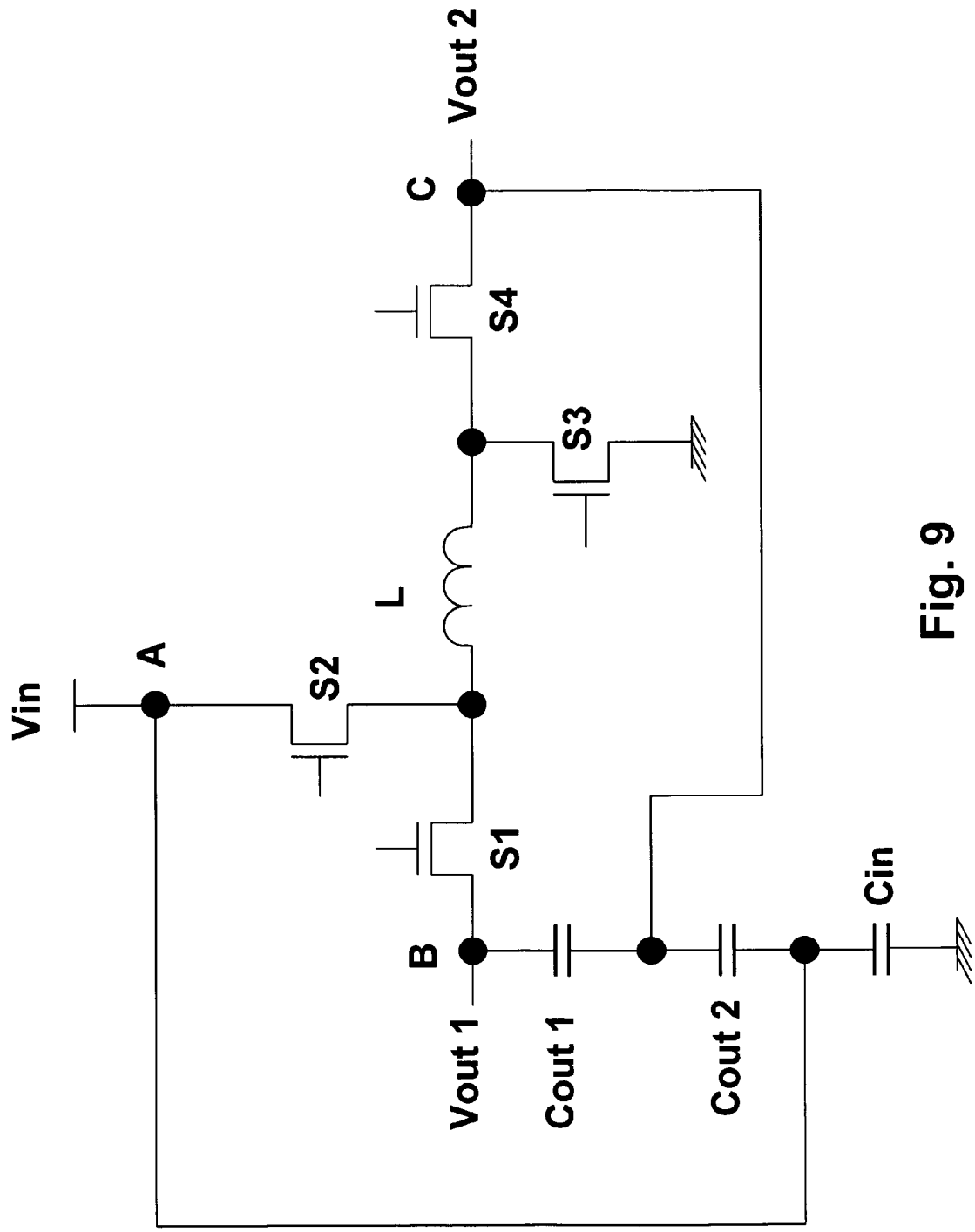

FIG. 9 shows a seventh possible connection of the present invention, wherein the lower end of the first output capacitor Cout1 is coupled to the node C, i.e., the upper end of the second output capacitor Cout2, and the lower end of the second output capacitor Cout2 is coupled to the node A. The first output voltage Vout1 provided by this connection is +V2+Vin−V1, and the second output voltage Vout2 can be +V2 (using a capacitor with a specification lower than that in FIG. 1) or higher than +V2 (using a capacitor with a specification the same as that in FIG. 1).

The foregoing embodiments are summarized as below:

| Lower end of Cout 1 | Lower end of Cout 2 | Vout 1 | Vout 2 |
|---|---|---|---|
| Ground | Ground | −V1 | +V2 |
| Ground | Node A | −V1 | +V2 or higher than +V2 |
| Ground | Node B | −V1 | +V2−V1 |
| Node A | Ground | Vin−V1 | +V2 |
| Node A | Node A | Vin−V1 | +V2 or higher than +V2 |
| Node A | Node B | Vin−V1 | +V2+Vin−V1 |
| Node C | Ground | +V2−V1 | +V2 |
| Node C | Node A | +V2+Vin−V1 | +V2 or higher than +V2 |

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention.

For example, an additional circuit device which does not substantially affect the primary function of the circuit can be interposed between two devices shown to be in direct connection in the embodiments of the present invention; some of the power transistors can be replaced by diodes; and so on. In view of the foregoing, the spirit of the present invention should cover all such and other modifications and variations, which should be interpreted to fall within the scope of the following claims and their equivalents.

What is claimed is:

1. A multi-output switching regulator, comprising:
a single-input-multiple-output voltage converter converting an input voltage to a first output voltage at a first node and a second output voltage at a second node, wherein the voltage converter is a single-inductor switching regulator;
an input capacitor connected with the input voltage at an input node;
a first output capacitor having two ends, one of which is fixedly connected with the first node; and
a second output capacitor having two ends, one of which is fixedly connected with the second node;
wherein the other end of the first output capacitor and the other end of the second output capacitor are switchable between at least two of the following connections:
(1) the other end of the first output capacitor being connected to ground, and the other end of the second output capacitor being connected to the input node;
(2) the other end of the first output capacitor being connected to ground, and the other end of the second output capacitor being connected to the first node;
(3) the other end of the first output capacitor being connected to the input node, and the other end of the second output capacitor being connected to ground;
(4) the other end of the first output capacitor being connected to the input node, and the other end of the second output capacitor being connected to the input node;
(5) the other end of the first output capacitor being connected to the input node, and the other end of the second output capacitor being connected to the first node;
(6) the other end of the first output capacitor being connected to the second node, and the other end of the second output capacitor being connected to ground;
(7) the other end of the first output capacitor being connected to the second node, and the other end of the second output capacitor being connected to the first node; or
(8) both the other end of the first output capacitor and the other end of the second output capacitor being connected to ground.

2. A multi-output switching regulator, comprising:
a single-input-multiple-output voltage converter converting an input voltage to a first output voltage at a first node and a second output voltage at a second node, wherein the voltage converter is a single-inductor switching regulator;
an input capacitor connected with the input voltage at an input node;
a first output capacitor having two ends, one of which is fixedly connected with the first node; and
a second output capacitor having two ends, one of which is fixedly connected with the second node;
wherein the other end of the first output capacitor is switchable among ground, the input node, and the second node.

3. A multi-output switching regulator, comprising:
a single-input-multiple-output voltage converter converting an input voltage to a first output voltage at a first node and a second output voltage at a second node, wherein the voltage converter is a single-inductor switching regulator;
an input capacitor connected with the input voltage at an input node;
a first output capacitor having two ends, one of which is fixedly connected with the first node; and
a second output capacitor having two ends, one of which is fixedly connected with the second node;
wherein the other end of the second output capacitor is switchable among ground, the input node, and the first node.

4. The multi-output switching regulator of claim 3, wherein the other end of the first output capacitor is switchable among ground, the input node, and the second node.

5. A method for controlling a multi-output switching regulator, comprising:
providing a single-input-multiple-output voltage converter, the single-input-multiple-output voltage converter converting an input voltage to a first output voltage at a first node and a second output voltage at a second node, wherein the voltage converter is a single-inductor switching regulator;
providing an input capacitor connected with the input voltage at an input node;
providing a first output capacitor having two ends, one of which is fixedly connected with the first node;
providing a second output capacitor having two ends, one of which is fixedly connected with the second node; and
providing switches at the other end of the first output capacitor and the other end of the second output capacitor so that the other end of the first output capacitor and the other end of the second output capacitor are switchable between at least two of the following connections:
(1) the other end of the first output capacitor being connected to ground, and the other end of the second output capacitor being connected to the input node;
(2) the other end of the first output capacitor being connected to ground, and the other end of the second output capacitor being connected to the first node;
(3) the other end of the first output capacitor being connected to the input node, and the other end of the second output capacitor being connected to ground;
(4) the other end of the first output capacitor being connected to the input node, and the other end of the second output capacitor being connected to the input node;
(5) the other end of the first output capacitor being connected to the input node, and the other end of the second output capacitor being connected to the first node;
(6) the other end of the first output capacitor being connected to the second node, and the other end of the second output capacitor being connected to ground;
(7) the other end of the first output capacitor being connected to the second node, and the other end of the second output capacitor being connected to the first node; or
(8) both the other end of the first output capacitor and the other end of the second output capacitor being connected to ground.

* * * * *